United States Patent
Sun et al.

(10) Patent No.: US 8,631,295 B2
(45) Date of Patent: *Jan. 14, 2014

(54) ERROR CONCEALMENT

(71) Applicant: Cambridge Silicon Radio Limited, Cambridge (GB)

(72) Inventors: Xuejing Sun, Rochester Hills, MI (US); Sameer Gadre, Northville, MI (US); Scott Plude, Royal Oak, MI (US)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,073

(22) Filed: Nov. 20, 2012

(65) Prior Publication Data

US 2013/0159805 A1    Jun. 20, 2013

Related U.S. Application Data

(63) Continuation of application No. 12/434,449, filed on May 1, 2009, now Pat. No. 8,316,267.

(51) Int. Cl.
*G06F 11/00* (2006.01)

(52) U.S. Cl.
USPC ........... 714/747; 714/758; 714/748; 714/752; 704/207; 704/205; 704/206; 375/240.02

(58) Field of Classification Search
None
See application file for complete search history.

(56) References Cited

U.S. PATENT DOCUMENTS

| | | | |
|---|---|---|---|
| 4,792,953 A * | 12/1988 | Pasdera et al. | 714/747 |
| 5,142,537 A | 8/1992 | Kutner et al. | |
| 5,799,039 A | 8/1998 | Laird et al. | |
| 7,155,654 B2 * | 12/2006 | Chien et al. | 714/747 |
| 7,206,986 B2 | 4/2007 | Stemerdink et al. | |
| 7,233,897 B2 | 6/2007 | Kapilow | |
| 7,409,338 B1 * | 8/2008 | Nien | 704/200 |
| 7,529,673 B2 * | 5/2009 | Makinen et al. | 704/265 |
| 8,316,267 B2 | 11/2012 | Sun et al. | |
| 2003/0055631 A1 | 3/2003 | Chen | |
| 2003/0078769 A1 | 4/2003 | Chen | |
| 2003/0093746 A1 | 5/2003 | Kang et al. | |
| 2003/0220787 A1 | 11/2003 | Svensson et al. | |
| 2005/0050407 A1 | 3/2005 | El-Maleh et al. | |

(Continued)

FOREIGN PATENT DOCUMENTS

WO    01/93488 A1    12/2001

OTHER PUBLICATIONS

Kovesi, B. et al., "A Low Complexity Packet Loss Concealment Algorithm for ITU-T G.722," IEEE International Conferences on Acoustics, Speech, and Signal Processing, Mar. 30-Apr. 4, 2008, pp. 4769-4772.

U.S. Appl. No. 12/356,631, filed Jan. 21, 2009.

(Continued)

*Primary Examiner* — John Trimmings
(74) *Attorney, Agent, or Firm* — Frommer Lawrence & Haug LLP; John W. Branch

(57) ABSTRACT

A method and apparatus for selectively replacing damaged portions of a data stream. The method comprises analyzing the data stream to identify damaged portions therein; selecting a damaged portion for replacement; and replacing the selected damaged portion. The selected damaged portion is selected for replacement in dependence on a rate of replacement, the rate of replacement being that at which previous portions of the data stream have been replaced.

20 Claims, 4 Drawing Sheets

(56) References Cited

U.S. PATENT DOCUMENTS

| | | | |
|---|---|---|---|
| 2006/0088093 A1 | 4/2006 | Lakaniemi et al. | |
| 2006/0182091 A1 | 8/2006 | Park et al. | |
| 2007/0198254 A1 | 8/2007 | Goto et al. | |
| 2007/0239462 A1* | 10/2007 | Makinen et al. | 704/500 |
| 2008/0027710 A1 | 1/2008 | Jacobs et al. | |
| 2008/0046237 A1 | 2/2008 | Zopf et al. | |
| 2008/0046249 A1 | 2/2008 | Thyssen et al. | |
| 2008/0235554 A1* | 9/2008 | Simmons et al. | 714/752 |
| 2009/0281797 A1* | 11/2009 | Zopf et al. | 704/207 |
| 2010/0185441 A1 | 7/2010 | Sun et al. | |
| 2010/0251051 A1 | 9/2010 | Sun et al. | |
| 2010/0281321 A1 | 11/2010 | Sun et al. | |
| 2010/0324911 A1 | 12/2010 | Jougit et al. | |
| 2012/0014434 A1 | 1/2012 | Hong et al. | |

OTHER PUBLICATIONS

Official Communication for U.S. Appl. No. 12/359,036 mailed Jun. 27, 2012.

Official Communication for U.S. Appl. No. 12/359,036 mailed Sep. 20, 2012.

Official Communication for U.S. Appl. No. 12/414,546 mailed Jun. 6, 2012.

Official Communication for U.S. Appl. No. 12/414,546 mailed Nov. 21, 2012.

Official Communication for U.S. Appl. No. 12/414,546 mailed Feb. 4, 2013.

Official Communication for U.S. Appl. No. 12/414,546 mailed Mar. 27, 2013.

Official Communication for U.S. Appl. No. 12/434,449 mailed Jul. 19, 2012.

Official Communication for U.S. Appl. No. 12/434,449 mailed May 21, 2012.

Cheetham et al., Error Concealment for Voice over WLAN in Converged Enterprise Networks, 15th IST Mobile & Wireless Communications Summit 2006, Mykonos, Jun. 4-8, 2006.

Fingscheidt et al., Softbit Speech Decoding: A New Approach to Error Concealment, IEEE Transactions on Speech and Audio Processing, vol. 9, No. 3, Mar. 2001, pp. 240-251.

Perkins et al., A Survey of Packet-Loss Recovery Techniques for Streaming Audio, IEEE Network Magazine, Sep./Oct. 1998.

ITU-T Recommendation G.711 Appendix I, "A high quality low-complexity algorithm for packet loss concealment with G.711," 1999.

Office action dated Feb. 1, 2012 in copending U.S. Appl. No. 12/359,036.

* cited by examiner

ERROR CONCEALMENT

CROSS-REFERENCE TO RELATED APPLICATIONS

This application is a continuation under 35 U.S.C. §120 of application Ser. No. 12/434,449, filed May 1, 2009, now U.S. Pat. No. 8,316,267. This application is related to copending application Ser. No. 12/359,036 filed Jan. 3, 2009, and application Ser. No. 12/414,546 filed Mar. 30, 2009.

FIELD OF THE INVENTION

This invention relates to replacing damaged portions of a data stream, and in particular to selecting those damaged portions to be replaced. The present invention is particularly applicable to selecting damaged portions of a voice signal to be replaced in packet loss concealment methods.

BACKGROUND OF THE INVENTION

Wireless and voice-over-internet-protocol (VoIP) communications are frequently subject to adverse connection conditions. Signals transmitted under such conditions suffer from bit errors which result in the signal quality at the receiving end of the communication being degraded. A degraded packet of a signal comprising one or more bit error is generally considered either to be lost or damaged. The distinction usually depends on the position of the bit error within the packet. Typically, if the header of a packet comprises a bit error, the packet is considered to be lost and the entire packet is rejected. However, if the payload of the packet comprises one or more bit errors (often called residual bit errors) but the header does not also comprise a bit error, the packet is considered to be damaged.

In the case of voice communications, degraded packets result in clicks and pops or other artifacts being present in the output voice signal at the receiver. These artifacts degrade the perceived speech quality of the output voice signal and may render the speech unrecognisable if the bit error rate is sufficiently high.

Broadly speaking, two approaches are taken to combat the problem of bit errors. The first approach is the use of transmitter-based recovery techniques. Such techniques include retransmission of degraded packets (for example automatic repeat-request) and adding error correction coding bits to the transmitted packets such that bit errors can be detected at the receiver and the degraded packets can be reconstructed (for example forward error correction). Transmitter based recovery techniques suffer from high power consumption and high bandwidth requirements. Additionally, in poor signal conditions they inherently lead to network congestion and delays. These techniques are suited to data transmissions for which the integrity of the received signal is of overriding importance. Generally, for voice communications, the output voice signal is required to meet two criteria: intelligibility and a sufficiently high perceptual quality. Exact reproduction of the transmitted signal in the output voice signal is not necessary for these criteria to be met.

The second approach taken to combating the problem of degraded packets is the use of receiver-based concealment techniques. Receiver-based concealment techniques are generally used in addition to transmitter-based recovery techniques to conceal any remaining degradation left after the transmitter-based recovery techniques have been employed. In voice and multimedia communications interpolation-based techniques are commonly used. These techniques generate a replacement packet by interpolating parameters from the packets on one or both sides of the degraded packet. A parameter commonly chosen for interpolation is the pitch period. A waveform of the estimated pitch period or a multiple of the estimated pitch period is generated as a substitute for the degraded packet. These so-called pitch based waveform substitution techniques are limited in that they are typically only effective when the packet loss rate is low (less than about 15%) and when handling short packets of between 4 ms and 40 ms.

When treating packet errors with pitch based waveform substitution techniques, all the information in a degraded packet is discarded regardless of whether that degraded packet is lost or damaged. However, damaged packets often contain information that can be used to improve the quality of the output voice signal. Approaches utilising the information in accessible damaged packets have been suggested. The simplest approach is to output the damaged packet without treating the bit errors in the payload.

Another approach is called soft decision source decoding (SDSD). SDSD, described in *Softbit speech decoding: a new approach to error concealment* (Fingscheidt and Vary; *IEEE Transactions on speech and audio processing*, vol 9, March 2001), is a statistical approach to concealing errors in a bit stream. Voice signals are analyzed at the bit stream level. An attempt is made to reproduce the original source bit sequence from a corrupted bit sequence using a statistical model. The probabilities that particular bit combinations were transmitted given the bit combination received are estimated using the statistical model, information about the codec, and the channel conditions when the signal was received. Optimum values for the original source bit sequence are determined and decoded conventionally.

U.S. Pat. No. 5,799,039 describes a further approach. The received voice signal is analyzed to determine a degree of corruption of the signal. The specific nibbles likely to be corrupted are identified. A look-up table that links predetermined replacement values to each nibble value is stored. The look up table is suitable for use with an ADPCM (adaptive differential pulse code modulation) bit stream. One of the predetermined replacement values is selected in dependence on the degree of corruption to replace each corrupted nibble. The replaced nibbles and the remaining signal are passed to a decoder to be decoded conventionally.

Although these two approaches utilize parts of a damaged packet that are not corrupted, they are limited in that they require access to the encoded bit stream and possibly also to the codec. Such access is not readily available in codecs that are implemented in hardware. Additionally, systems implementing each of these approaches are codec dependent in that further statistical models and look up tables would need to be designed and implemented in order to handle further codecs.

A further error concealment method has been proposed (Cheetham and Nasr; *Error concealment for voice over WLAN in converged enterprise networks;* 15th *IST Mobile & Wireless Communications Summit* 2006) that targets specific samples within a damaged voice packet to be concealed. A short term linear predictor is used at the receiver to generate predicted samples within a damaged packet which are expected to be close to the transmitted samples. Such a technique has been applied to a WINDECT VoWLAN system where packets contain 20 ms of voice encoded by G711 log-PCM. Bit errors in the voice stream are indicated by a parity check over the most significant four bits of each sample. Received samples which fail the parity check are replaced by their corresponding predicted values. Additionally, an attempt may be made to identify which of the four most significant bits is in error. The identified bit is then inverted.

If used in combination with a packet degradation concealment system, this method is likely to require substantial additional memory and greater computational complexity than other proposed methods. This is problematic for low power resource constrained platforms such as Bluetooth.

There is thus a need for an improved bit error concealment system that is robust, codec independent and of low computational complexity such that it is suitable for low power platforms.

SUMMARY OF THE INVENTION

According to a first aspect of this invention, there is provided a method of selectively replacing damaged portions of a data stream, comprising: analyzing the data stream to identify damaged portions therein; selecting a damaged portion for replacement; and replacing the selected damaged portion; wherein the selected damaged portion is selected for replacement in dependence on a rate of replacement, the rate of replacement being that at which previous portions of the data stream have been replaced.

Suitably, the method comprises replacing the selected damaged portion with a replacement portion by replacing at least one sample of the selected damaged portion.

Suitably, the method further comprises assigning a portion replacement value to each portion of the data stream, wherein the rate of replacement associated with the selected damaged portion is a weighted average of a previous rate of replacement associated with the portion previous to the selected damaged portion and the portion replacement value of the portion previous to the selected damaged portion.

Suitably, the method comprises assigning a first portion replacement value to portions of the data stream that are replaced, and assigning a second portion replacement value to portions of the data stream that are not replaced.

Preferably, the method further comprises forming an output for each portion of the data stream.

Suitably, for each damaged portion, if the rate of replacement associated with the damaged portion is greater than a threshold rate, the output is the damaged portion.

Suitably, the method comprises selecting a damaged portion for replacement if the rate of replacement associated with the selected damaged portion is less than a threshold rate.

Suitably, for each damaged portion, if the rate of replacement associated with the damaged portion is less than a threshold rate, the method comprises: selecting that damaged portion for replacement; and replacing the selected damaged portion with a replacement portion, wherein the output for that damaged portion is the replacement portion.

Suitably, for each damaged portion, if the rate of replacement associated with the damaged portion is greater than a threshold rate, the method further comprises applying a pre-defined algorithm to determine whether to replace the damaged portion and output a replacement portion or to output the damaged portion, the algorithm being dependent on at least one criterion.

Suitably, for each damaged portion, if the rate of replacement associated with the damaged portion is less than a threshold rate, the method further comprises applying a pre-defined algorithm to determine whether to replace the damaged portion and output a replacement portion or to output the damaged portion, the algorithm being dependent on at least one criterion.

Suitably, a first criterion is the level of degradation of the damaged portion, wherein a level of degradation lower than a threshold level promotes output of the damaged portion.

Suitably, the method comprises determining the level of degradation of the damaged portion by performing a correlation between the damaged portion and a candidate replacement portion for the damaged portion.

Suitably, a second criterion is whether the damaged portion has a property characteristic of noise, wherein the damaged portion having a property characteristic of noise promotes output of the damaged portion.

Suitably, the method comprises determining whether the damaged portion has a property characteristic of noise by computing the zero crossing rate of the damaged portion.

Suitably, a third criterion is whether the damaged portion comprises a click, wherein the damaged portion comprising a click promotes selection of the damaged portion for replacement, replacement of the selected damaged portion with a replacement portion, and output of the replacement portion for the damaged portion.

Suitably, the method comprises determining if the damaged portion comprises a click by comparing the energy of the damaged portion to the energy of a portion proximal to the damaged portion.

Suitably, the method further comprises: analyzing the data stream to identify lost portions and error-free portions therein; replacing each lost portion with a replacement portion, wherein the output for each lost portion is its respective replacement portion; wherein the output for each error-free portion is that error-free portion.

Suitably, the method further comprises: analyzing segments of the data stream to identify those segments consisting of more than a first number of samples; splitting each segment consisting of more than the first number of samples into portions, at least one of the portions consisting of up to the first number of samples.

According to a further aspect of the invention, there is provided a method of selectively replacing damaged portions of a data stream, the method comprising: for each damaged portion, estimating an error rate of the data stream; and applying a pre-defined algorithm to determine whether to replace the damaged portion, wherein the algorithm: (a) causes the output of the damaged portion if the estimated error rate is above a threshold; and (b) has a propensity to cause the output of a replacement portion in place of the damaged portion if the estimated error rate is below the threshold.

According to a further aspect of the invention, there is provided a method of selectively replacing damaged portions of a data stream, the method comprising: for each damaged portion, estimating an error rate of the data stream; and applying a pre-defined algorithm to determine whether to replace the damaged portion, wherein the algorithm: (a) causes the output of a replacement portion in place of the damaged portion if the estimated error rate is below the threshold; and b) has a propensity to cause the output of the damaged portion if the estimated error rate is above a threshold.

According to a further aspect of the invention, there is provided an apparatus configured to selectively replace damaged portions of a data stream, the apparatus comprising: a damage indicator configured to analyze the data stream to identify damaged portions therein; a selection module configured to select a damaged portion for replacement, wherein the selection module is configured to select the damaged portion for replacement in dependence on a rate of replacement, the rate of replacement being that at which previous portions of the data stream have been replaced; and a replacement module configured to replace the selected damaged portion.

BRIEF DESCRIPTION OF THE DRAWINGS

The present invention will now be described by way of example with reference to the accompanying drawings, wherein.

DETAILED DESCRIPTION OF THE INVENTION

Figure 1:
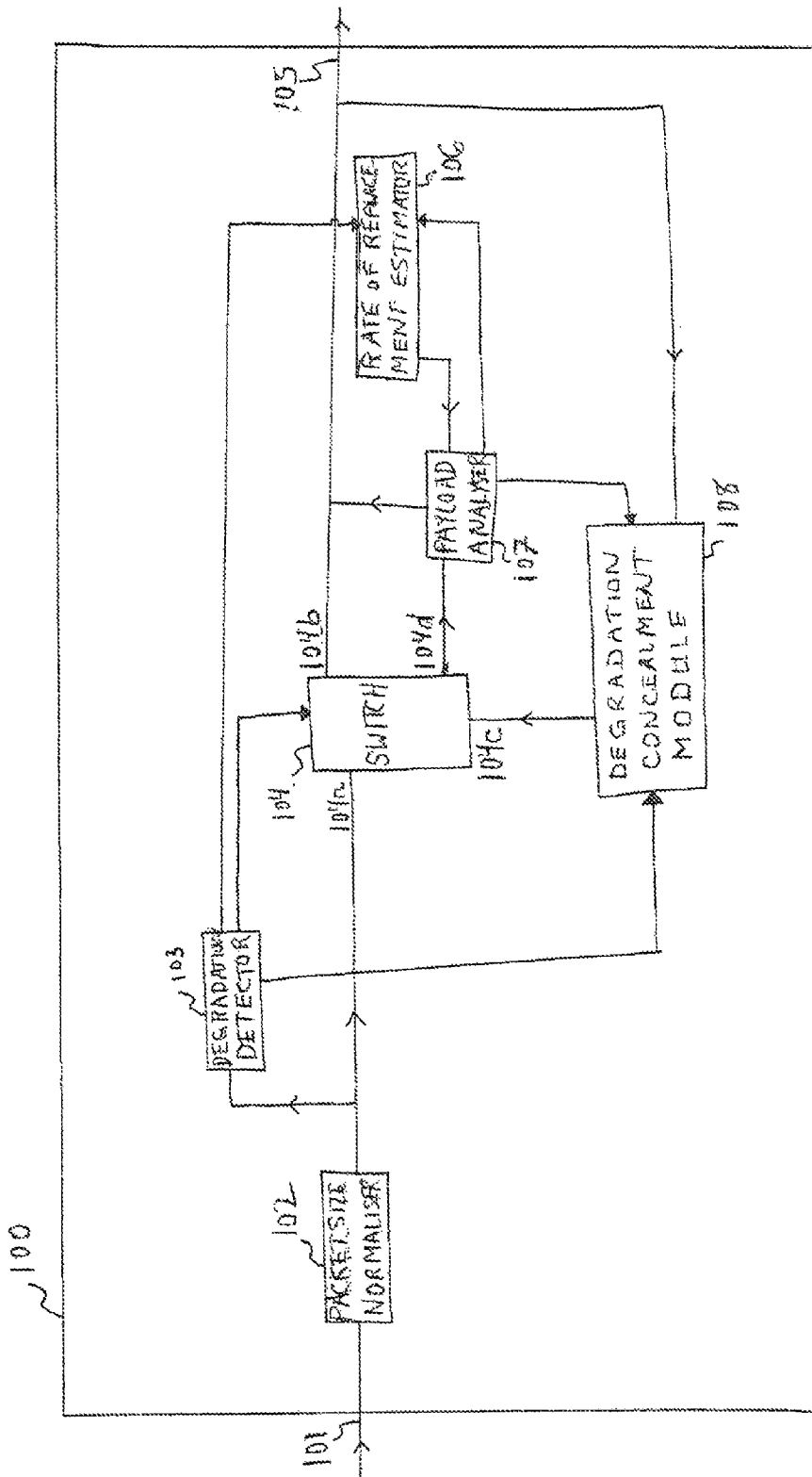
FIG. 1 is a schematic diagram of a signal processing apparatus according to the present disclosure.

FIG. 1 shows a schematic diagram of the general arrangement of a signal processing apparatus. In FIG. 1, solid arrows terminating at a module indicate control signals. Other arrows indicate the direction of travel of signals between the modules.

A data stream is input to signal processing apparatus 100 on line 101. Line 101 is connected to an input of packet size normaliser 102. A first output of packet size normaliser 102 is connected to an input of degradation detector 103. A first control output of degradation detector 103 is connected to an input of switch 104. A second output of packet size normaliser 102 is connected to a second input of switch 104. A first output of switch 104 is connected to an output of the signal processing apparatus 100 on line 105.

The signal processing apparatus also comprises a rate of replacement estimator 106. A second control output of degradation detector 103 is connected to a first control input of rate of replacement estimator 106. The signal processing apparatus also comprises a payload analyzer 107. A second output of switch 104 is connected to a first input of payload analyzer 107. A second output of rate of replacement estimator 106 is connected to a second input of payload analyzer 107. A first output of payload analyzer 107 is connected to the first output of switch 104. A first control output of payload analyzer 107 is connected to a second control input of rate of replacement estimator 106.

The signal processing apparatus also comprises a degradation concealment module 108. A third control output of degradation detector 103 is connected to a first control input of degradation concealment module 108. A second control output of payload analyzer 107 is connected to a second control input of degradation concealment module 108. Degradation concealment module 108 receives a further input which is the signal output from the signal processing apparatus on line 105. An output from degradation concealment module 108 is connected to a third input of switch 104.

Figure 3:
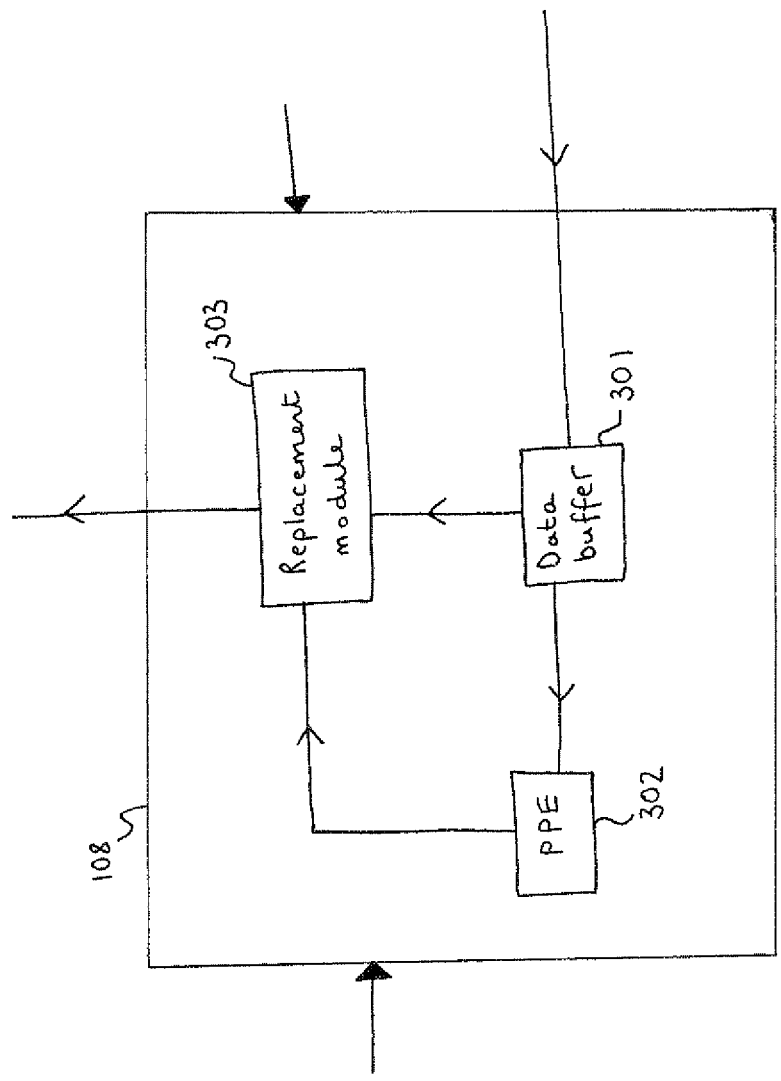
FIG. 3 is a schematic diagram of a module suitable for use as the packet degradation concealment module of FIG. 1.

One example implementation of the degradation concealment module 108 is shown in FIG. 3. Degradation concealment module 108 comprises a data buffer 301, a pitch period estimation module 302 and a replacement module 303. Data buffer 301 receives as an input the signal output from the processing apparatus (on line 105 of FIG. 1). A first output of data buffer 301 is connected to an input of the pitch period estimation module 302. A second output of data buffer 301 is connected to a first input of replacement module 303. An output of pitch period estimation module 302 is connected to a second input of replacement module 303. An output of replacement module 303 is connected to the output of degradation concealment module 108 that leads to the third input of switch 104.

In operation, signals are processed by the signal processing apparatus of FIG. 1 (and FIGS. 3 and 4) in discrete temporal parts. The following description refers to processing packets of data, however the description applies equally to processing frames of data or any other suitable portions of data. These portions of data are generally of the order of a few milliseconds in length.

Figure 2:
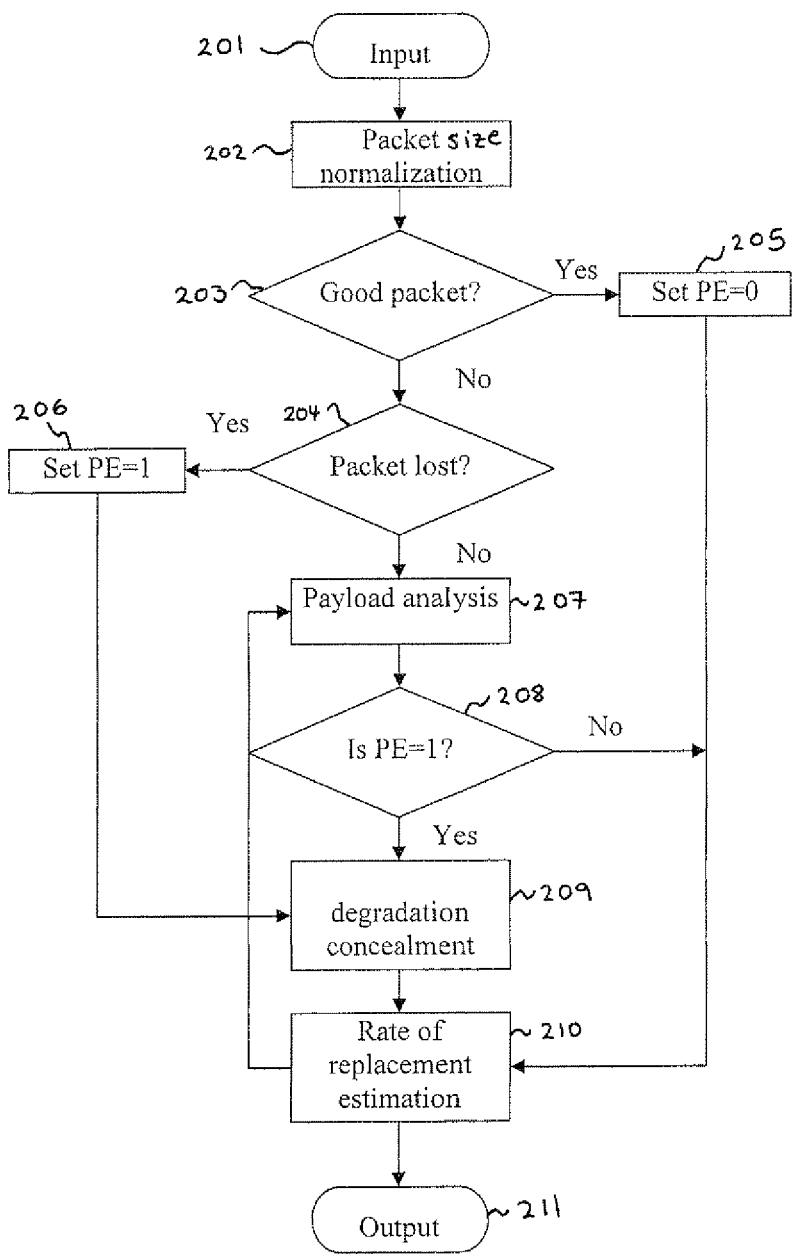
FIG. 2 is a flow chart illustrating the method by which signals are processed by the apparatus of FIG. 1.

The method of processing a data stream input to apparatus 100 will be described with reference to the flow chart of FIG. 2. In step 201 of FIG. 2, each packet of the voice signal is sequentially input into the signal processing apparatus 100 on line 101.

At step 202, each packet is input to the packet size normaliser 102 for packet size normalisation. Packet size normalisation is a process by which packets that are longer than a predefined threshold length are split up into shorter packets.

A suitable pseudo code for performing the packet normalisation process is as follows:

```
if (packet_length > packet_length_max)
    new_packet_length = packet_length;
    loop_counter = 1;
    while new_packet_length > packet_length_max,
        new_packet_length = floor(new_packet_length/2);
        loop_counter = loop_counter * 2;
    end
    for i=1:loop_counter−1
        do PLC(new_packet_length)
    end
    % process the last packet size
    last_packet_length = packet_length − (loop_counter−1)* new_packet_length;
end
```

The pseudo code first compares the length of the packet it is processing against a threshold length, referred to in the code as packet_length_max. If the packet length is greater than the threshold length, the code enters a loop. In the loop, a new packet length is defined as the floor operator of half of the previous packet length. The floor operator maps a real number to the next smallest integer. Consequently, the new packet length is chosen to be half the previous packet length rounded down to the nearest integer. In the next loop, the new packet length is compared against the threshold length. If the new packet length is greater than the threshold length, then another new packet length is defined using the floor operation described above. The loop continues to repeat whilst each newly computed packet length is greater than the threshold length. Each loop is assigned a loop counter. The first loop counter is 1. The loop counter of each subsequent loop is twice the loop counter of the previous loop. The loop is broken when a new packet length is no longer greater than the threshold length.

The second portion of the pseudo code illustrates the determination of the sizes of each packet that are formed from the original packet. The pseudo code determines that the original packet is to be split up into a number of packets comprising a first number of packets and a last packet. The first number of packets is a number equal to one less than the loop counter. Each of these packets has the same length as the new packet length of the final loop. The length of the last packet is determined by multiplying one less than the loop counter of the final loop by the new packet length of the final loop, and subtracting the result of this multiplication from the original packet length.

In the pseudo code illustrated, the decision has already been made that the packet being processed is to be concealed (PLC refers to the commonly used terminology packet loss concealment). The code directs that packet concealment should be carried out for the newly sized packets. This code may be suitable, for example if packet size normalisation is computed after determination of whether to conceal the packet.

At steps 203 and 204 each packet is processed by the degradation detector 103. The degradation detector may process packets before they are processed by packet size normaliser 102. Alternatively, as shown in FIGS. 1 and 2, the degradation detector may process packets after they are processed by packet size normaliser 102. The degradation detector 103 determines whether each packet is good (error-free), lost or damaged.

Packets generally comprise a header portion preceding a payload portion. The degradation detector may perform a header error check (HEC) on the header portion of the packet. If the packet fails the HEC it is treated as lost. If the packet passes the HEC it is processed further to determine whether it is good (error-free) or damaged.

The determination of whether a packet is good or damaged can be determined by a further check on the payload. For example, a CRC may be performed on the payload. If the packet passes the header error check but fails the payload error check, it is treated as damaged. If the packet passes the header error check and passes the payload error check, it is treated as good (error-free). CRC is limited, however, in that it does not indicate the location of the bit error or how many bit errors there are.

The method and apparatus described herein are suitable for implementation in Bluetooth devices. Bluetooth eSCO packet types include CRC, enabling the distinction between a lost and damaged packet to be made as described herein.

The term 'pass' is used herein to mean that the portion of the packet being analyzed is determined not to have a bit error by the check being performed. The term 'fail' is used herein to mean that the portion of the packet being analyzed is determined to have a bit error by the check being performed.

If error-detecting bits (such as CRC bits) have not been added to the packet, then alternative methods at the receiver may be used to infer the presence of bit errors. For example, errors in a bit stream can be inferred by comparison against a statistical model. For example, a statistical model may be used to associate a probability with each received bit sequence, the probability indicating a likelihood that the received bit sequence is the sequence that was transmitted, and hence a likelihood that the received bit sequence is erroneous. If more than a threshold number of received bit sequences in a packet are identified as erroneous by the statistical model, then the packet may be determined to be damaged and the identified bit sequences are replaced with generated data. Alternatively, a click and pop detection module may be used to identify bit errors in the voice signal.

If the packet is determined to be good (error-free) then it is output from the apparatus without further modification, in other words without being replaced by a packet generated using degradation concealment module 108. This is implemented by the degradation detector outputting a sequence of control signals. At step 205 the degradation detector 103 sends a control signal to rate of replacement estimator 106 indicating that the packet is good. The rate of replacement estimator sets the packet error for that good packet to the appropriate value for a good packet. For example, the packet error for the good packet may be 0. The packet error indicates whether the packet is to be, or has been, replaced. The degradation detector 103 sends a further control signal to switch 104. This control signal controls the switch to connect input 104a to output 104b, thereby switching the good packet through to the output of the apparatus. Optionally, the degradation detector 103 may further send a control signal to the degradation concealment module indicating that a replacement packet is not to be generated for the good packet.

If the packet is determined to be lost then a replacement packet is generated for the lost packet by degradation concealment module 108, and it is this replacement packet that is output from the apparatus instead of the lost packet. This is implemented by the degradation detector outputting a sequence of control signals. At step 206 the degradation detector 103 sends a control signal to rate of replacement estimator 106 indicating that the packet is lost. The rate of replacement estimator sets the packet error for that lost packet to the appropriate value for a lost packet. For example, the packet error for the good packet may be 1. The degradation detector 103 does not control switch 104 to connect the lost packet to the output of the apparatus. The degradation detector sends a control signal to the degradation concealment module controlling it to generate a replacement packet. At step 209 the degradation concealment module generates a replacement packet. After having generated the replacement packet, the degradation concealment module outputs the replacement packet to the switch 104. The degradation detector controls switch 104 to connect input 104c to output 104b, thereby passing the replacement packet to the output of the apparatus on line 105.

If the packet is determined to be damaged then the degradation detector controls the switch 104 to connect input 104a to output 104d. This causes the damaged packet to be switched through to the payload analyzer 107. The degradation detector 103 also controls the switch 104 to connect input 104c to output 104b. This causes any replacement packet that may be generated to be output from the signal processing apparatus 100. The degradation detector 103 does not control the degradation concealment module 108 to generate a replacement packet. Optionally, the degradation detector 103 may send a control signal to the rate of replacement estimator indicating that the packet is damaged. However, if such a signal is sent the rate of replacement estimator does not respond by setting the packet error for the damaged packet to a particular value.

The payload analyzer 107 performs one or more analyses on the damaged packet to determine whether to replace the damaged packet. The payload analyzer determines whether to replace the damaged packet or not in dependence on a rate of replacement that is associated with that damaged packet. The rate of replacement associated with that damaged packet of the data stream is determined by the rate of replacement estimator 106.

Before describing the analysis performed by the payload analyzer 107, the determination of the rate of replacement associated with a packet will be described. This is indicated at step 210. Each packet that is processed by the signal processing apparatus of FIG. 1 is associated with a rate of replacement. The rate of replacement associated with a packet is the rate at which previous packets of the data stream have been replaced. The rate of replacement associated with a packet is determined before the packet has been fully processed by the signal processing apparatus 100. In the case that the packet is a damaged packet, its associated rate of replacement is determined before the payload analyzer has determined whether the packet is to be replaced or not. The rate of replacement associated with a packet is determined at step 210 after the previous packet has been output from switch 104 to the output of the apparatus 100.

The rate of replacement of a packet can be considered to be an estimate of the instantaneous packet error rate at the time that that packet is being processed. In this definition, a packet is considered to be in error if it has sufficient errors to require replacement.

Each packet that is processed by the signal processing apparatus 100 of FIG. 1 is either output from the apparatus as it is, or is replaced by a packet generated in the degradation concealment module 108. Each packet that is output without replacement is assigned a first packet error value. For example, this value may be 0. Each packet that is replaced with a replacement packet is assigned a second packet error value. For example, this value may be 1. The packet error value can also be called a packet replacement value since it is an indication of whether the packet is replaced. The rate of replacement estimator 106 uses control signals from the degradation detector 103 to assign packet error values to good and lost packets. The rate of replacement estimator 106 uses control signals from the payload analyzer to assign packet error values to damaged packets.

The rate of replacement associated with the nth packet is generated in a recursive manner by using the rate of replacement associated with the (n−1)th packet and the packet replacement value of the (n−1)th packet. A suitable equation for calculating the rate of replacement is given by:

$$RoR[n]=(1-\alpha)RoR[n-1]+\alpha PE[n-1] \quad \text{(equation 1)}$$

where RoR is the rate of replacement (packet error rate), PE is the packet error value (packet replacement value), n denotes the nth packet, and $\alpha$ is a constant between 0 and 1.

In the implementation of equation 1, the rate of replacement (packet error rate) associated with the nth packet is a weighted average of the rate of replacement associated with the (n−1)th packet and the packet error value of the (n−1)th packet. The value of $\alpha$ determines the weighting applied to the packet error value of the (n−1)th packet and to the rate of replacement associated with the (n−1)th packet. The greater the value of $\alpha$, the greater the relative weighting that is applied to the packet error value of the (n−1)th packet compared to the rate of replacement associated with the (n−1)th packet. The value of $\alpha$ determines the effective averaging time in that it determines the number of previous packets that will have a significant effect on the packet error rate associated with the current packet.

The weighting parameter $\alpha$ may be determined in dependence on a time constant and the ratio of the sampling rate of the signal to the packet length of the signal. For example, $\alpha$ may be derived as follows:

$$\alpha=1-\exp(-1/(T \cdot F_s/L)) \quad \text{(equation 4)}$$

where T is a time constant, $F_s$ is the sampling rate, and L is the packet length in samples.

As an example, if
T=0.04 seconds
$F_s$=8 kHz
L=30 samples $$\alpha=1-\exp(-1/(0.04 \cdot 8000/30)) \quad \text{(equation 5)}$$

$\alpha$=0.089

The rate of replacement estimator 106 outputs the rate of replacement associated with a damaged packet (i.e. the rate of at which previous packets of the data stream have been replaced) to the payload analyzer 107. On receipt of a damaged packet and the rate of replacement associated with that damaged packet, the payload analyzer performs one or more analyses (step 207).

The first analysis performed by the payload analysis in conjunction with a particular damaged packet is to compare the rate of replacement associated with that damaged packet against a pre-defined threshold rate.

A suitable pseudo code for performing this comparison is as follows:

```
PE = 1
if RoR > PER_THRESHOLD
    PE = 0
else
    PE = Payload_analysis
end
```

In this pseudo code, the packet error value of the damaged packet is initially set to 1. If the rate of replacement associated with the damaged packet (RoR) is greater than a threshold value (PER_THRESHOLD), the packet error value of the damaged packet is redefined as 0. If the rate of replacement associated with the damaged packet is not greater than the threshold value then further analysis is carried out on the payload of the damaged packet.

If the rate of replacement associated with the damaged packet is greater than the threshold rate then the damaged packet is not replaced. The option NO is selected at step 208. The packet is treated as if it is a good packet in that the payload analyzer outputs the packet onto line 105 to be output from the signal processing apparatus 100 without being replaced. Payload analyzer 107 sends a control signal to rate of replacement estimator 106 indicating that the damaged packet is not being replaced. In response to the control signal, rate of replacement estimator 106 sets the packet error value for that damaged packet to the same packet error value that a good packet has. For example, the packet error value for a damaged packet that is not replaced may be set to 0. Optionally, the payload analyzer 107 sends a further control signal to degradation concealment module 108 indicating that no replacement packet needs to be generated for the damaged packet.

If the rate of replacement associated with the damaged packet is less than the threshold rate then further analysis is performed on the payload of the damaged packet. A pre-defined algorithm is applied to the damaged packet to determine whether to replace the damaged packet (and select option YES at step 208) or to not replace the packet (and select option NO at step 208). This determination allows the packet error value for the damaged packet to be set. The algorithm is dependent on at least one criterion.

A first optional criterion is the level of degradation of the damaged packet. This can be determined by computing a correlation coefficient between the damaged packet and a candidate synthesised packet. Suitably, the synthesised packet is generated by the degradation concealment module 108 under the control of the payload analyzer 107. The synthesised packet is output to the payload analyzer (connection not shown on FIG. 1). If the correlation coefficient is sufficiently high, this criterion promotes the option to the payload analyzer of outputting the damaged packet from the signal processing apparatus 100 without replacement. This is because the high correlation coefficient is taken to be an indication that the damaged packet is largely intact, or at least that there is no significant benefit offered by performing a packet degradation replacement algorithm. If the correlation coefficient is low, the criterion promotes the option to the payload analyzer of replacing the damaged packet with a replacement packet (for example the synthesised packet).

A second optional criterion is whether the damaged packet has a property characteristic of noise. This can be determined using an analysis of the zero crossing rate (ZCR) of the damaged packet. If the ZCR of the packet is greater than a threshold value, this criterion promotes the option to the payload analyzer of outputting the damaged packet from the signal processing apparatus 100 without replacement. This is based on the observation that if a packet containing bit errors exhibits noise like characteristics, the original packet (prior to degradation) is likely to have been a noise packet rather than a voiced packet. There is therefore no benefit derived from generating a replacement packet for the damaged packet. Additionally, outputting the damaged noise packet avoids the computational complexity associated with generating a replacement packet. Furthermore, outputting the damaged packet avoids the possibility of replacing an unvoiced packet with a voiced signal during a voiced-to-unvoiced transition period of the signal. If the ZCR is low, the criterion does not promote to the payload analyzer the option of replacing the damaged packet with a replacement packet. This is because a packet with bit errors and a low ZCR does not indicate that the original packet (prior to degradation) is likely to have been voiced. In this case, the packet could have been voiced or unvoiced.

A third optional criterion is whether the damaged packet comprises a click. This can be determined by comparing the energy spectrum of the damaged packet against the energy spectrums of the packets surrounding the damaged packet. Bit errors often result in impulsive noise like artifacts, manifested by higher energy and a spread spectrum compared to neighbouring packets. If the damaged packet has significantly higher energy than the packets surrounding it, this criterion promotes to the payload analyzer the option of replacing the damaged packet with a replacement packet. If the click can be localised within the packet, then the replacement packet may be generated by only replacing the region of the damaged packet in which the click is localised. A high pass filter may be used prior to the click detection to facilitate the click detection.

Further criteria may be used depending on the analysis resources available. If more than one criterion is used, the algorithm may prioritise the promotions of the various criteria. For example, the algorithm may always replace the damaged packet with a replacement packet generated using the degradation concealment module if this option is promoted by the click detection criterion regardless of the promotions of the other criteria.

As an alternative to performing the pre-defined algorithm, if the rate of replacement associated with the damaged packet is less than the threshold rate, the payload analyzer may select the damaged packet for replacement. In this case, the payload analyzer sends a control signal to the degradation concealment module indicating that a replacement packet is to be generated. The payload analyzer also sends a control signal to the rate of replacement estimator 106 indicating that the damaged packet is to be replaced. In response to this control signal, the rate of replacement estimator 106 sets the packet error value of the damaged packet to the packet error value that a lost packet would have. For example, the packet error value for the damaged packet may be set to 1. The degradation concealment module 108 generates a replacement packet and outputs it to switch 104. Switch 104 outputs the replacement packet to line 105 for output from the signal processing apparatus 100 under the control of degradation detector 103.

If the payload analyzer selects to output the damaged packet without replacement, it outputs the damaged packet onto line 105 for output from the signal processing apparatus 100. Additionally, the payload analyzer sends a control signal to rate of replacement estimator 106 indicating that the damaged portion is not being replaced. In response, the rate of replacement estimator 106 sets the packet error value of the damaged packet to the value for a good packet, for example 0. If the payload analyzer selects a damaged packet for replacement, it outputs a control signal to the degradation concealment module controlling it to generate a replacement packet. In response, the degradation concealment module generates a replacement packet and outputs it to switch 104. Switch 104 switches the replacement packet through to line 105, under the control of degradation detector 103, to output the replacement packet from the apparatus 100. The payload analyzer additionally sends a control signal to rate of replacement estimator 106 indicating that the damaged packet is being replaced. In response, the rate of replacement estimator 106 sets the packet error value of the damaged packet to the value for a lost packet, for example 1. The payload analyzer may perform some basic error concealment.

Each packet that is output from the apparatus 100 on line 105 is additionally input to the degradation concealment module 108. Degradation concealment module 108 uses the outputted packets in order to generate future replacement packets.

In an alternative implementation of the payload analyzer, the payload analyzer compares the rate of replacement associated with a damaged packet against a pre-defined threshold rate. However, in this implementation, if the rate of replacement is less than the threshold rate, the damaged packet is selected for replacement with a replacement packet. If the rate of replacement is greater than the threshold rate, then further analysis is performed on the payload of the damaged packet.

A suitable pseudo code for performing this comparison is as follows:

```
PE = 0
if RoR < PER_THRESHOLD'
    PE = 1
else
    PE = Payload_analysis
end
```

In this pseudo code, the packet error value of the damaged packet is initially set to 0. If the rate of replacement associated with the damaged packet (RoR) is less than a threshold value (PER_THRESHOLD'), the packet error value of the damaged packet is redefined as 1 and a replacement packet is generated for the damaged packet by the degradation concealment module. This replacement packet is output from the apparatus 100 instead of the damaged packet. If the rate of replacement associated with the damaged packet is not less than the threshold value then further analysis is carried out on the payload of the damaged packet to determine whether the packet should be replaced or not. This further analysis involves applying a pre-defined algorithm to the damaged packet as discussed in relation to the first implementation of the payload analyzer.

The payload analyzer can be designed such that the proportion of damaged packets that are replaced is comparable whether the first implementation or the implementation described above is used. For example, the respective threshold rates PER_THRESHOLD and PER_THRESHOLD' can each be adjusted, the threshold levels associated with the criteria on which the pre-defined algorithm depends can be adjusted, and/or the weight that the algorithm applies to the promotions of the criteria can be adjusted. Such adjustments cause the payload analyzer to alter the ratio of damaged packets selected for replacement (with packet error equal to 1) to damaged packets selected for output (with packet error equal to 0).

A suitable implementation of the degradation concealment module 108 is shown in FIG. 3. Each packet output from apparatus 100 is input to data buffer 301. The control signal sent to the degradation concealment module 108 from degradation detector 103 controls the degradation concealment module 108 to perform the following operations. Data buffer 301 is enabled to output a data packet or packets to pitch period estimation module 302. The data packet or packets output by the data buffer 109 are proximal to the degraded packet. Suitably, the data packet or packets output by the data buffer are those most recently decoded or most recently generated by a packet concealment operation. Alternatively, the data buffer may store and output packets from the data stream prior to the packets being decoded. The packet or packets output by the data buffer may have preceded the degraded packet in the data stream or followed the degraded packet in the data stream.

The pitch period estimation module 302 estimates the pitch period of the packet or packets it receives. This estimate is used as an estimate of the pitch period of the degraded packet.

The pitch period estimation module 302 outputs the estimated pitch period to the replacement module 303. The replacement module 303 selects data from the data buffer 301 in dependence on the estimated pitch period. The selected data is used as a replacement for the degraded packet.

Suitably, the replacement module 303 performs a pitch-based waveform substitution. Suitably, this involves generating a waveform at the pitch period estimated by the pitch period estimation module 302. Overlap-add is advantageously applied to fade the generated waveform of the degraded packet into the received signal on either side thereby achieving smooth concatenation. Replacement module 303 outputs the replacement packet to switch 104.

The degradation concealment module 108 may generate a replacement packet by replacing all of the data in the damaged packet. Alternatively, the degradation concealment module 108 may generate a replacement packet by partially replacing data in the damaged packet. For example, specific samples or bits in the damaged packet may be identified and replaced to form a replacement packet.

If retransmissions of a payload are accessible, then the signal processing apparatus of FIG. 1 can be configured such that it initially compares the multiple instances of the payload. The best candidate is selected as a candidate payload. This candidate payload is then processed by the signal processing apparatus 100 of FIG. 1 as described herein.

As a further optional feature, a tone detection module may be included in the signal processing apparatus of FIG. 1. Suitably, the tone detection module utilises a pitch period estimated by the degradation concealment module. Tones have exact periodic signals enabling them to be easily identified. Suitably, a lost or damaged packet that exhibits a tone, or any exact periodic signal, is replaced using the degradation concealment module regardless of the rate of replacement associated with the packet.

The method and apparatus described herein determines whether to replace a damaged packet in dependence on a rate of replacement associated with the damaged packet, wherein the rate of replacement is the rate at which previous packets of the data stream have been replaced. The rate of replacement associated with a packet is a measure of the instantaneous packet error rate of the data stream at the time that the packet is being processed. Unlike prior systems, the effective packet error rate determination does not require access to the encoded bit stream. The effective error rate is determined based on the quality of the history of the packet concealment output rather than raw packet errors.

The determination of the effective packet error rate using the method described herein and the determination of whether to select a damaged packet for replacement does not require knowledge of the codec being used. The method described is therefore codec independent because it can be applied without modification to data streams which have been encoded using a different codec. It may be preferable to modify the threshold rate above which damaged packets are not replaced using a packet concealment algorithm for a different codec. This modification is easily implemented without requiring a modification to the core method.

The method described herein is particularly suitable for use with the Bluetooth voice protocol which uses a CVSD (continuous variable slope delta modulation) codec. This codec is comparatively robust to poor channel conditions. Bluetooth signals are received at 64 kHz and downsampled to 8 kHz. The high sampling rate significantly reduces the impact of bit errors. Additionally, CVSD applies the same weight to each bit in the bit stream, whereas many other codecs apply more weight to some bits than others which can cause severe artifacts if an error occurs in a more significant bit. Random bit errors in CVSD bit streams are manifested by background noise in the decoded speech.

The method described herein is particularly suitable for low power platforms such as Bluetooth. For example, the method is suitable for implementation in battery powered voice communication devices. The metrics described for the packet error rate determination and the payload analyses are all low in complexity. They present little additional computation to a pitch based packet degradation concealment algorithm.

In the method described herein, a bit error concealment method is proposed using a packet concealment algorithm, for example a packet concealment algorithm that utilises pitch period estimation. Such algorithms are effective when the packet loss rate is low, but often produce noticeable artifacts in the output voice signal when the packet loss rate is high. For example, the output signal may comprise robot-sounding artifacts. These artifacts degrade the intelligibility of the output signal. At high packet loss rates, the received signal comprising damaged packets often has a higher perceptual quality than a signal to which a packet concealment algorithm has been applied to the damaged packets. The method described herein therefore disables the packet concealment algorithm for damaged packets at high packet loss rates. Packet concealment is used for lost packets regardless of the packet loss rate because lost packets are always discarded. Damaged packets that have associated low packet loss rates may undergo packet concealment or not depending on further analysis.

The choice of the threshold below which the packet loss rate is considered to be low and above which the packet loss rate is considered to be high is generally dependent on criteria such as packet length, overall packet error rate, and the ratio of damaged packets to degraded (lost or damaged) packets. For example, if the packet error rate is 20% and most of the degraded packets are lost packets, then it is preferable not to replace most of the damaged packets so as to recover as much of the original signal as possible. On the other hand, if most of the degraded packets are damaged packets, then it is preferable to apply a packet concealment algorithm more aggressively to the damaged packets.

The length of packets and the type of packets in a voice communication protocol is generally not set. For example, Bluetooth has 11 types of synchronous packets with payload lengths ranging from 1 to 540 bytes. Different modulation schemes are often applied to the payloads, for example Gaussian Frequency Shift Keying (GFSK), π/4 rotated differential encoded quaternary phase shift keying (π/4-DQPSK), and differential encoded 8-ary phase shift keying (8DPSK). These modulation schemes have different sensitivities to interference and transmission errors. Different payload lengths, header lengths and modulation schemes all result in different packet loss rates and payload error distributions.

If raw packet errors were to be used to estimate the packet error rate then many different thresholds would need to be defined for different combinations of the criteria listed above. For example, a higher threshold would be defined for a packet type whose dominant packet errors are payload errors rather than packet loss. This is because some of the damaged packets may contain negligible errors and therefore can be regarded as being good packets.

The method and apparatus described herein overcomes the problem of requiring many different thresholds by estimating the packet error rate using knowledge of the rate at which previous packets have been replaced, rather than using raw packet loss rates or payload error rates. Estimating a packet error rate to be a measure of the quality of the past packet concealment outputs has a direct impact on the quality of future packets that are generated using the concealment scheme. If packet errors contain mostly payload errors, then the estimated packet error rate (rate of replacement) fluctuates around the threshold and results in the degradation concealment module replacing every other damaged payload. However, if packet errors mostly contain header errors (and are therefore determined to be lost), then the packet error rate (rate of replacement) will be higher than the threshold. This leads to damaged packets being outputted without replacement, thereby preserving more of the original data. The adjustment inherent in the method by which the packet error rate of the method described herein is determined therefore allows a single threshold to be used.

The method described herein performs packet size normalization. This is advantageous for the following reasons. Firstly, packet degradation concealment algorithms operate optimally with medium sized packets. Splitting up packets that are longer than a threshold length ensures that the resulting packets are of a more practical length for such algorithms. Secondly, splitting long packets into shorter ones increases the chance of isolating the location of distortions caused by bit errors. This increases utilisation of an original damaged packet, since only the resulting short packet in which a bit error is isolated need be replaced. Thirdly, splitting packets up leads to higher time resolution which is desirable for processing fast voicing transition segments.

Subjective listening and objective PESQ tests have shown significant improvements when the method described herein is enabled in Bluetooth voice communications.

FIGS. 1 and 3 are schematic diagrams of the apparatus described herein. The method described does not have to be implemented at the dedicated blocks depicted in these figures. The functionality of each block could be carried out by another one of the blocks described or using other apparatus. For example, the method described herein could be implemented partially or entirely in software. Additionally, only functionality pertinent to the present disclosure has been described and illustrated in the figures. Further functionality is typically involved, for example decoding of the signal. Decoding is typically performed before error concealment techniques are employed. A suitable arrangement would be for degradation detection to be performed on the signal at the bit stream level, followed by decoding of the signal, and finally error concealment. Alternatively, degradation detection could be performed after the signal has been decoded. As a further alternative, the signal may be decoded after error concealment.

The method described is useful for packet loss/error concealment techniques implemented in wireless voice or VoIP communications. The method is particularly useful for products such as some Bluetooth and Wi-Fi products that involve applications with coded audio transmissions such as music streaming and hands-free phone calls.

Figure 4:
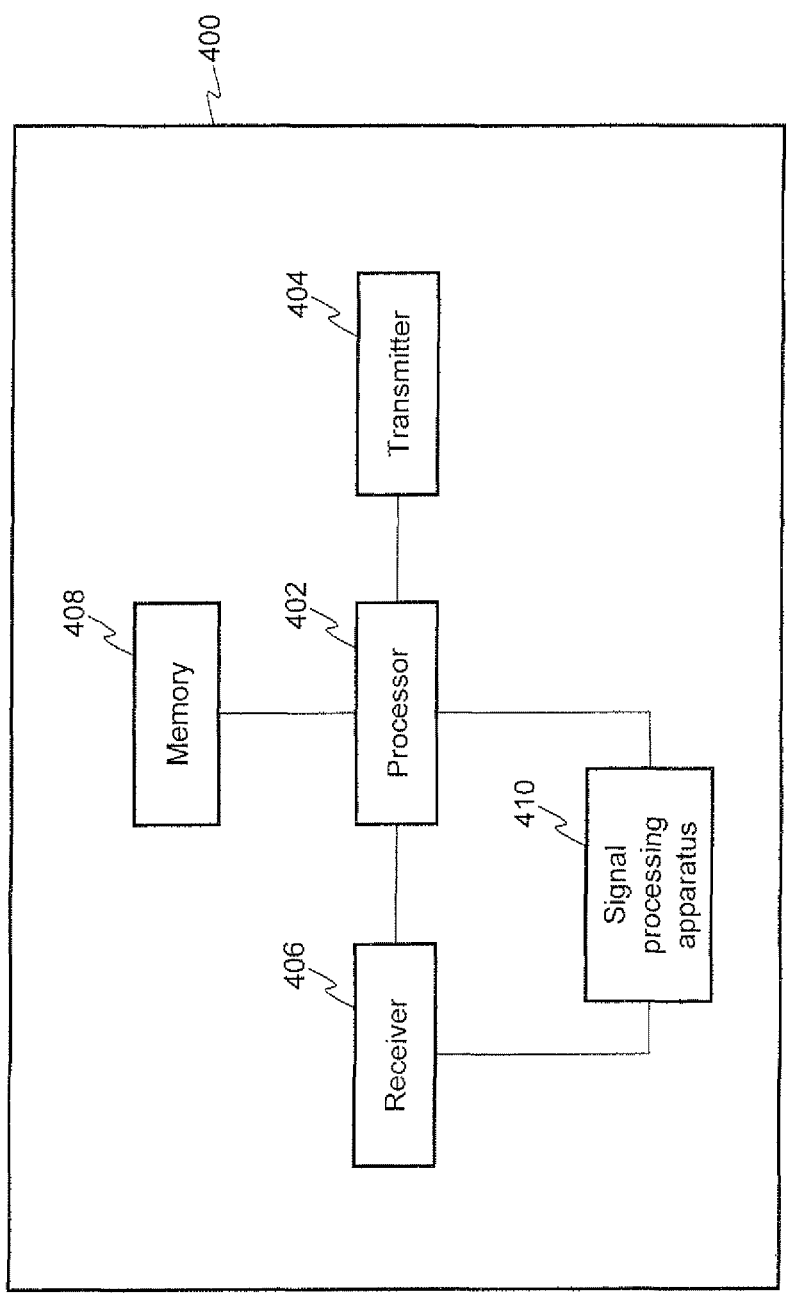
FIG. 4 is a schematic diagram of a transceiver suitable for comprising the signal processing apparatus of FIG. 1.

The signal processing apparatus of FIG. 1 could usefully be implemented in a transceiver. FIG. 4 illustrates such a transceiver 400. A processor 402 is connected to a transmitter 404, a receiver 406, a memory 408 and a signal processing apparatus 410. Any suitable transmitter, receiver, memory and processor known to a person skilled in the art could be implemented in the transceiver. Preferably, the signal processing apparatus 410 comprises the apparatus of FIG. 1. The signal processing apparatus is additionally connected to the receiver 406. The signals received and demodulated by the receiver may be passed directly to the signal processing apparatus for processing. Alternatively, the received signals may be stored in memory 408 before being passed to the signal processing apparatus. The transceiver of FIG. 4 could suitably be implemented as a wireless telecommunications device. Examples of such wireless telecommunications devices include handsets, headsets, desktop speakers and handheld mobile phones.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of selectively replacing damaged portions of a data stream, the method comprising:
    for each damaged portion, estimating an error rate of the data stream; and
    applying a pre-defined algorithm to determine whether to replace the damaged portion, wherein the algorithm:
    (a) causes the output of the damaged portion if the estimated error rate is above a threshold; and
    (b) has a propensity to cause the output of a replacement portion in place of the damaged portion if the estimated error rate is below the threshold.

2. The method as claimed in claim 1, wherein if the estimated error rate is below the threshold, the algorithm is dependent on at least one criterion, wherein said at least one criterion is the level of degradation of the damaged portion and wherein a level of degradation lower than a threshold level promotes output of the damaged portion.

3. The method as claimed in claim 1, wherein if the estimated error rate is below the threshold, the algorithm is dependent on at least one criterion, wherein said at least one criterion is the level of degradation of the damaged portion and wherein a level of degradation higher than a threshold level promotes output of the replacement portion in place of the damaged portion.

4. The method as claimed in claim 1, wherein if the estimated error rate is below the threshold, the algorithm is dependent on at least one criterion, wherein said at least one criterion is whether the damaged portion has a property characteristic of noise, wherein the damaged portion having a property characteristic of noise promotes output of the damaged portion.

5. The method as claimed in claim 1, wherein if the estimated error rate is below the threshold, the algorithm is dependent on at least one criterion, wherein said at least one criterion is whether the damaged portion has a property characteristic of noise, wherein the damaged portion not having a property characteristic of noise promotes output of the replacement portion in place of the damaged portion.

6. The method as claimed in claim 1, wherein if the estimated error rate is below the threshold, the algorithm is dependent on at least one criterion, wherein said at least one criterion is whether the damaged portion comprises a click, wherein the damaged portion comprising the click promotes the selection of the damaged portion for replacement, replacement of the selected damaged portion with a replacement portion, and output of the replacement portion for the damaged portion.

7. The method as claimed in claim 6 wherein the replacement portion is identical to the damaged portion except in a region localized to the click position.

8. The method as claimed in claim 6 further comprising:
determining if the damaged portion comprises the click by comparing the energy of the damaged portion to the energy of a portion proximal to the damaged portion.

9. The method as claimed in claim 1, wherein the output of a replacement portion in place of the damaged portion comprises the steps of:
estimating a pitch period of the damaged portion; and
forming a replacement portion for outputting by the algorithm, wherein the replacement portion is formed in dependence on the estimated pitch period.

10. The method as claimed in claim 1, further comprising:
analyzing segments of the data stream to identify those segments consisting of more than a first number of samples;
splitting each segment consisting of more than the first number of samples into portions, at least one of the portions consisting of up to the first number of samples.

11. A method of selectively replacing damaged portions of a data stream, the method comprising:
for each damaged portion, estimating an error rate of the data stream; and
applying a pre-defined algorithm to determine whether to replace the damaged portion, wherein the algorithm:
(a) causes the output of a replacement portion in place of the damaged portion if the estimated error rate is below a threshold; and
b) has a propensity to cause the output of the damaged portion if the estimated error rate is above the threshold.

12. The method as claimed in claim 11, wherein if the estimated error rate is above the threshold, the algorithm is dependent on at least one criterion, wherein said at least one criterion is the level of degradation of the damaged portion and wherein a level of degradation lower than a threshold level promotes output of the damaged portion.

13. The method as claimed in claim 11, wherein if the estimated error rate is above the threshold, the algorithm is dependent on at least one criterion, wherein said at least one criterion is the level of degradation of the damaged portion and wherein a level of degradation higher than a threshold level promotes output of the replacement portion in place of the damaged portion.

14. The method as claimed in claim 11, wherein if the estimated error rate is above the threshold, the algorithm is dependent on at least one criterion, wherein said at least one criterion is whether the damaged portion has a property characteristic of noise, wherein the damaged portion having a property characteristic of noise promotes output of the damaged portion.

15. The method as claimed in claim 11, wherein if the estimated error rate is above the threshold, the algorithm is dependent on at least one criterion, wherein said at least one criterion is whether the damaged portion has a property characteristic of noise, wherein the damaged portion not having a property characteristic of noise promotes output of the replacement portion in place of the damaged portion.

16. The method as claimed in claim 11, wherein if the estimated error rate is above the threshold, the algorithm is dependent on at least one criterion, wherein said at least one criterion is whether the damaged portion comprises a click, wherein the damaged portion comprising the click promotes the selection of the damaged portion for replacement, replacement of the selected damaged portion with a replacement portion, and output of the replacement portion for the damaged portion.

17. The method as claimed in claim 16 wherein the replacement portion is identical to the damaged portion except in a region localized to the click position.

18. The method as claimed in claim 16 further comprising:
determining if the damaged portion comprises the click by comparing the energy of the damaged portion to the energy of a portion proximal to the damaged portion.

19. The method as claimed in claim 11, wherein the output of a replacement portion in place of the damaged portion comprises the steps of:
estimating a pitch period of the damaged portion; and
forming a replacement portion for outputting by the algorithm, wherein the replacement portion is formed in dependence on the estimated pitch period.

20. The method as claimed in claim 11, further comprising:
analyzing segments of the data stream to identify those segments consisting of more than a first number of samples;
splitting each segment consisting of more than the first number of samples into portions, at least one of the portions consisting of up to the first number of samples.

* * * * *